Patented May 2, 1950

2,505,910

UNITED STATES PATENT OFFICE 2,505,910

OXIDATION OF MERCAPTANS

Wayne A. Proell, Chicago, Ill., and Bernard H. Shoemaker, Hammond, Ind., assignors to Standard Oil Company, Chicago, Ill., a corporation of Indiana No Drawing. Application December 27, 1946, Serial No. 718,900

15 Claims. (Cl. 260—503)

This invention relates to an improved oxidation process. More particularly, it relates to a process for the catalytic oxidation of mercaptans. In one aspect, the invention relates to a novel catalytic oxidation process for the production of sulfonic acids.

It is an object of this invention to provide an improved catalytic oxidation process whereby mercaptans are oxidized to compounds containing sulfur and oxygen in chemical combination. Another object of this invention is to provide novel and efficient oxidation catalysts. Still another object is to provide a novel catalytic oxidation process for the production of sulfonic acids. An additional object is to provide an improved process for the manufacture of substantially anhydrous sulfonic acids. Further objects will become apparent as the description of our invention proceeds.

Briefly, we have discovered that mercaptans can be oxidized to yield organic compounds wherein a sulfur atom is chemically bound to an oxygen atom by a gas containing free oxygen in the presence of a catalytic quantity of a nitrogen oxide selected from the group consisting of $NO$, $NO_2$, $N_2O_3$, $N_2O_4$, and $N_2O_5$.

The mercaptans employed as feed stocks for the purposes of our invention are organic compounds containing a —SH (sulfhydryl) group linked to a carbon atom which is non-tertiary, i. e., a carbon which is not linked separately to three other carbon atoms, and which is not linked by a double valence bond to an element other than carbon, e. g. oxygen, nitrogen, sulfur, etc. We prefer to employ mercaptans containing only carbon, hydrogen and sulfur in the molecule. However, the mercaptans may also contain other functional groups in the molecule which may or may not be oxidizable under the reaction conditions employed in our catalytic oxidation process. We will not attempt to set out a complete list of functional groups auxiliary to the sulfhydryl group in feed stocks suitable for use in our process, but more or less typical functional groups which might be included are unsaturated organic linkages, such as olefin double bonds, halogen, nitro, amino, substituted amino, amido, carboxyl, hydroxyl, etc. In general, we prefer to use as feed stocks mercaptans containing no other functional group which oxidizes under the reaction conditions employed in our catalytic oxidation process. We may use individual mercaptans or mixtures thereof as feed stocks for our oxidation process.

Suitable for use as charging stocks in our oxidation process are hydrocarbon thiols, having the formula RSH wherein R is a hydrocarbon radical. R may be an alkyl group or a cycloalkyl, aryl, aralkyl, alkaryl or other hydrocarbon monovalent radical. Suitable alkyl groups comprise, for example, methyl, isopropyl, sec. butyl, amyl, lauryl, hexadecyl, octadecyl, and the like. Suitable cycloalkyl groups include, for example, cyclopentyl, methylcyclopentyl, cyclohexyl, methylcyclohexyl, dimethylcyclopentyl, decahydronaphthyl, and the like. Suitable aryl radicals comprise, for example, phenyl, naphthyl, diphenyl, phenanthryl, etc. Suitable aralkyl radicals comprise, for example, benzyl, alpha- and beta-phenylethyl and the like. Suitable alkaryl radicals comprise, for example, tolyl, xylyl, ethylphenyl, hexadecylphenyl, tert-butylphenyl, and the like.

Particularly suitable feed stocks for the purpose of our invention are aliphatic and aromatic mercaptans. Aliphatic mercaptans suitable as feed stocks for our catalytic oxidation process can be obtained from various petroleum fractions derived from sulfur-bearing crude oils. A suitable method of obtaining mercaptans comprises the extraction of a petroleum fraction, e. g., a petroleum distillate boiling within the boiling range of gasoline, naphtha, or kerosene, with a caustic solution, followed by stripping the caustic solution with open steam to separate mercaptans as a steam distillate. We may subject the mixture of mercaptans thus produced to our oxidation process or we may separate the mercaptans, for example by fractional distillation, and subject relatively pure individual mercaptans to our oxidation process. The solubility of the mercaptans in caustic can be increased by the addition to the caustic of so-called "solutizers," such as the simple phenols, particularly cresols and xylenols, organic acids, particularly those having 3 to 7 carbon atoms, such as isobutyric acid, alcohols, glycols, amines, aromatic acids, such as cumic acid, etc.

Alkyl mercaptans can be prepared synthetically by a variety of methods, including the reactions of an alkyl halide with a metal hydrosulfide and the addition of hydrogen sulfide to olefins, generally under the influence of catalysts. For example, hydrogen sulfide adds to the unsaturated linkage of olefin hydrocarbons in the vapor phase in the presence of silica gel or active clays, as described in U. S. Patent 1,836,183, or of a phosphorous acid catalyst, especially a silicophosphoric acid catalyst of the type prepared in accordance with U. S. Patents 1,993,513, 2,120,702 and 2,275,182. Addition of hydrogen sulfide to an olefinic double bond in the sense contrary to that required by Markownikow's rule can be effected in the presence of certain catalytic influences, e. g., ultraviolet rays or other means of producing free radicals in the reaction zone (see for example F. F. Rust and W. E. Vaughan, J. Org. Chem. 7, 6 (Nov. 1942), pp. 472 et seq.).

By the contra-Markownikow addition of hydrogen sulfide to olefins, other than ethylene, having terminal double bonds it is possible to prepare primary alkyl mercaptans which constitute a highly desirable feed stock for our catalytic oxidation process. Desirable feed stocks are alkyl mercaptans, particularly primary alkyl mercaptans, containing at least ten, and preferably ten to sixteen, carbon atoms in the molecule, which may be converted in accordance with our process into substantially anhydrous sulfonic acids having desirable wetting properties.

In accordance with our invention, mercaptans are oxidized by means of a gas stream containing free oxygen, as in air, in the presence of a small, catalytic quantity of one or more nitrogen oxides selected from the group consisting of NO, $NO_2$, $N_2O_3$, $N_2O_4$, and $N_2O_5$. Although all members of this group are useful, it is not intended to imply that they are equally efficacious in all respects. The mercaptan is oxidized by the free oxygen and not by the nitrogen oxide or oxides, which can be recovered unchanged upon completion of the oxidation reaction and may be reused to catalyze the oxidation of further quantities of mercaptan with free oxygen. If desired, nitrogen oxides suitable for the purpose of our invention can be generated in the oxidation zone by adding a small quantity of nitric acid. The decomposition of nitric acid in the oxidation zone also yields water.

The quantity of nitrogen oxide used as the catalyst will, naturally, vary with the particular nitrogen oxide selected for use, the particular feed stock, and the particular oxidation products being sought. In general, less than 10% by weight of nitrogen oxides based on the total oxygen absorption is necessary, and usually the use of about 1 to about 5% by weight on total oxygen consumed is preferable. However, we may use as much as 20 to 50% of nitrogen oxides in order to obtain very rapid reaction. The nitrogen oxide catalyst can be introduced into the oxidation zone with either the mercaptan or with the gas containing free oxygen, or with both, or may be introduced separately. The nitrogen oxide catalyst may be recovered from effluents passing from the oxidation zone and recycled to the same or a different oxidation zone.

It appears that a very small proportion of water in the reaction zone enhances the catalytic effect of the nitrogen oxides, as evidenced by an increase in the oxidation rate. Excessive proportions of water should not be maintained in the reaction zone, since they appear to reduce the oxidation rate and yield aqueous oxidation products, e. g., sulfonic acids which, oftentimes, must be dehydrated before sale or use. We may use about 0 to about 0.2 mol of water per mol of mercaptan in the reaction zone.

The specific oxidation conditions such as temperature, pressure, reaction time, proportion of catalyst, etc., will depend to some extent upon the particular feed stock, catalyst, and oxidation product sought to be obtained. By control of the reaction variables, it is possible to produce sulfoxides, sulfones, sulfonic acids, or a mixture containing one or more of these types of oxidation products. However, in its preferred embodiment our invention is directed to a process for the production of sulfonic acids, particularly anhydrous sulfonic acids by catalytic oxidation of mercaptans, and will hereinafter be described with particular reference to the production of sulfonic acids.

A generally applicable range of oxidation temperatures is about 20 to about 300° F. A preferable range is between about 50° F. and about 120° F. Appreciable thermal decomposition of sulfonic acids sets in at temperatures in the range of about 250 to about 300° F.

Since, in our catalytic oxidation process, we seek to avoid decomposition of sulfonic acids, which are the preferred products of our process, the limiting upper temperature at which our process should be operated will be in the general vicinity of 300° F., that is to say between about 250 and about 300° F. The reaction may be started at room temperature and, since the reaction is exothermic, the temperature of the reaction mixture increases; the rate of oxidation may thereafter be controlled by abstracting heat from the reaction zone at a rate sufficient to maintain the desired reaction temperature. Where the mercaptan is maintained in the liquid phase during the oxidation, the reaction temperature may be controlled by introducing a vaporizable inert liquid, e. g., petroleum hexane, into the oxidation zone and allowing it to vaporize from the oxidation mixture under controlled pressure. Indirect heat exchange apparatus may also be used to control the temperature in the oxidation zone.

Ordinarily it is convenient and preferable to maintain the mercaptan in the liquid phase during the oxidation reaction. This result can be readily attained by proper control of the pressure on the oxidation reaction zone. Pressures in the range of about 5 to about 50 p. s. i. are convenient and generally sufficient. Other reaction conditions being constant, the rate of oxidation will increase with increasing partial pressures of oxygen in the oxidation zone. When using air or other gases containing relatively small proportions of oxygen, e. g., flue gas containing free oxygen, it is desirable to operate the oxidation zone under pressure to increase the oxygen concentration therein. The oxidation reaction may, however, be effected in the vapor phase, especially when relatively low-boiling sulfur compound feed stocks, e. g., feed stocks boiling below 245° F., are employed. For promoting the vapor phase reaction it is desirable to pack the reactor with an inert solid which serves as a surface for the reaction and as a heat transfer medium. Materials which can be employed include silica gel, glass beads, Carborundum, glazed and unglazed ceramic material, $BaSO_4$, etc.

Our oxidation process may be carried out batchwise, continuously, or semi-continuously. It may also be effected in a number of stages with or without product separation between stages. The oxidation reaction may be effected in conventional reaction kettles or autoclaves, or in a tubular convertor or contacting tower. A suitable form of reactor is a vertical tower provided with contacting means such as bubble cap trays or with packing such as ceramic bodies or fiber glass mats. Countercurrent contacting of liquid sulfur compound feed stock and the oxidizing gas stream proceeds efficiently in the types of reaction tower just described; the liquid feed is passed downwardly through the tower against a rising stream of oxidizing gas, all of which may be admitted at a point near the bottom of the tower or, preferably, aliquot portions of which are introduced at vertically spaced points along the tower. A tubular reactor equipped for spaced injection of oxidizing gas into a flowing stream of liquid or vaporized feed stock and oxidation products may also be employed; a reactor of this type permits fine control of the extent of oxidation, since overoxidation may be readily avoided by the introduction of relatively small or different quantities of oxidizing gas and/or catalyst at any one inlet.

We prefer to employ a "gas lift" type of reactor for conducting the oxidation process of the present invention. In this type of reactor, the charging stock and oxidizing gas containing the nitrogen oxide catalyst are passed downwardly together through a vertical reaction column which may be provided with packing material. The unconverted mercaptan charging stock and products collect as a liquid in the lower end of the reactor and are caused to recirculate by the gas lift effect exerted by the oxidizing gas which raises them through an external leg back to the top of the oxidation reactor. A heat exchanger placed about the gas lift leg aids in controlling the temperature in the reaction reactor. When the desired extent of oxidation has been achieved, products are withdrawn for recovery from the lower portion of the oxidation reactor. If desired, a liquid accumulating drum may be supplied below the reactor, containing a recycle line and a product withdrawal line. This type of reactor has been described and illustrated in application for Letters Patent Serial No. 702,989, filed by Wayne A. Proell on October 12, 1946. This application has since matured into Patent No. 2,489,316.

The various individual oxidation products may be recovered from the reaction mixture by conventional means which will vary with the nature of the individual reaction product mixture. Such methods as extraction with solvents, fractional crystallization, distillation and the like may be used. Products and catalyst carried out of the oxidation zone by the effluent oxidizing gas stream may be recovered by cooling, absorption, or other processes.

The alkane- or other sulfonic acids produced by the present process may be converted to salts such as sodium, potassium, calcium, magnesium, barium, nickel, lead, zinc, cadmium, silver, copper, chromium, etc. salts. Colored impurities and retained nitrogen oxides may be removed from the alkane- or other sulfonic acids produced by the present process by treating the sulfonic acid products with concentrated nitric acid, as described in application for Letters Patent Serial No. 704,994 filed by Wayne A. Proell on October 22, 1946, or by treatment with a liquid olefin as described in application for Letters Patent Serial No. 704,983, filed by Paul R. Fields on October 22, 1946. This application has since matured into Patent No. 2,502,618.

The following examples are presented in order to illustrate, but not necessarily to limit, our invention.

*Example 1*

Thirty-five cc. of n-dodecylmercaptan was charged to a small gas lift type oxidation reactor. Air was charged to the reactor at about 0.8 cu. foot per hour, the air being mixed with an additional 0.25 cu. foot per hour of $N_2O_4$ gas. No oxidation occured in half an hour, but the mercaptan turned bright red, and began to precipitate crystals. After 30 minutes it was necessary to warm the reactor. No $NO_2$ left the reactor. At 45 minutes, oxygen absorption began to the extent of 15%. A trace of $NO_2$ was observed in the off gas. The water bath was at 100–115° F. At 56 minutes, a sudden violent evolution of $NO_2$ occurred. The liquid in the reactor foamed violently and part was lost into the condenser. The off gas was a deep red and apparently was chiefly $N_2O_4$. The reaction of $N_2O_4$ evolution was over in a few minutes. The residual liquid lost its red color, and quietly oxidized at 85–60% efficiency, dropping to 40% at 1 hour, 20 minutes, 10% at 2 hours and 0% at 2 hours, 20 minutes. The dodecanesulfonic acid product was a brown oil when hot which solidified to a greasy paste when mixed with cold water. It dissolved in dilute sodium hydroxide solution to give an orange solution which foamed profusely.

The point at which vigorous reaction occurred appeared to coincide with the time some definite thio-nitrate type compound had formed to the extent of using up all the mercaptan initially present. The above data indicate roughly 1 mol of $N_2O_4$ was associated with 1 mol of mercaptan.

*Example 2*

Thirty-five cc. of n-dodecylmercaptan was charged, and the gas lift type reactor was immediately partly submerged in a hot water bath. At 20 minutes, the temperature was 180° F. and was held at this value until the end of the run. Air was charged at the rate of about 1 cu. foot per hour, and $N_2O_4$ at 0.19 cu. foot per hour. No oxidation occurred until 40 minutes, when oxygen absorption from the air stream rose to 5%. A little $NO_2$ appeared in the off gas at this time. The liquid was red in color. At 50 minutes a vigorous reaction occurred releasing $NO_2$ with much foaming. A few minutes later the liquid became pale in color. At 55 minutes 1 cc. of water was added to the reactor to retard darkening. Oxidation then proceeded quietly, the rate of oxygen absorption dropping to 0% at 3 hours, 20 minutes. The dodecanesulfonic acid product was an orange solid which was soluble in dilute caustic, yielding foamy solutions.

*Example 3*

Thirty-five cc. of n-butyl mercaptan was charged to an air lift reactor. whose temperature was controlled by a water bath which was maintained at a temperature between 140° F. and 150° F. throughout the experiment. Air was charged to the reactor at the rate of about 0.7 cu. foot per hour, together with $NO_2$ at the rate of 0.16 cu. foot per hour. A slight amount of oxidation occurred after 20 minutes and the rate of oxygen absorption from the air stream averaged about 10% for the next few hours, during which time the liquid in the reactor became a deep red in color. After 1 hour, 50 minutes, a violent disengagement of gas occurred, a large volume of $NO_2$ being released within a few seconds. The liquid in the reactor foamed but was refluxed back by the condenser surmounting the reaction column. The liquid in the reactor then became water white and oxidation began in earnest, the rate of oxygen absorption from the air stream rising to 85%, and continued till 5 hours. The n-butane sulfonic acid was pale yellow in color.

Alkanesulfonic acids, especially those wherein the alkyl group contains between about 1 and about 10 carbon atoms may be used as catalysts in numerous conversion operations, especially hydrocarbon conversion operations. They may be used as catalysts in processes wherein sulfuric acid has been employed and present the advantage thereover of not inducing undesirable side reactions such as sludge formation and oxidation reactions. Alkanesulfonic acids may be employed as catalysts for the hydration of olefins, for example the hydration of propylene to produce isopropyl alcohol. The lower alkanesulfonic acids may also be employed as catalysts for olefin polymerization, for example as described in application for Letters Patent Serial No. 704,992 and 704,993 filed, respectively, by George F. Rouault and Wayne A. Proell and by Wayne A. Proell, both on October 22, 1946. These applications have since become abandoned. The alkanesulfonic acids can be readily esterified with olefins, e. g., at room temperature by mixing.

The higher alkanesulfonic acids, especially those containing between about 12 and about 20 carbon atoms in the alkyl group, can be used for the preparation of excellent detergents. Their soaps, for example their sodium soaps, may be used in admixture with the sodium soaps of alkylbenzene sulfonates containing between about 12 and 16 carbon atoms in the alkyl side chain to prepare superior detergents.

From the foregoing, it will be apparent that we have provided a novel catalytic process for the oxidation of mercaptans with inexpensive reagents and in a substantially anhydrous system to produce organic compounds wherein a sulfur atom is chemically bound to an oxygen atom. In its preferred embodiment, this invention provides a catalytic process for the production of substantially anhydrous sulfonic acids by the catalytic oxidation of mercaptans in a substantially anhydrous oxidation system.

This application is a continuation in part of application for Letters Patent Serial No. 571,022 filed by the present applicants on January 1, 1945 now abandoned.

We claim:

1. A process for the production of a sulfonic acid, which process comprises contacting a saturated hydrocarbon thiol wherein the sulfhydryl group is linked to a non-tertiary carbon atom in a reaction zone with a gas containing free oxygen and a catalytic quantity of a nitrogen oxide selected from the group consisting of NO, $NO_2$, $N_2O_3$, $N_2O_4$ and $N_2O_5$ in the presence of not more than about 0.2 mol of water per mol of said hydrocarbon thiol, and recovering a sulfonic acid so produced.

2. A process for the production of a sulfonic acid, which process comprises oxidizing a saturated hydrocarbon thiol wherein the sulfhydryl group is linked to a non-tertiary carbon atom with a gas containing free oxygen and a catalytic quantity of a nitrogen oxide selected from the group consisting of NO, $NO_2$, $N_2O_3$, $N_2O_4$ and $N_2O_5$ in the presence of not more than about 0.2 mol of water per mol of said hydrocarbon thiol at a temperature between about 20° F. and about 300° F., and recovering a sulfonic acid so produced.

3. The process of claim 2 wherein the hydrocarbon thiol is maintained in the liquid phase in the course of the oxidation process.

4. A process for the production of a sulfonic acid, which process comprises contacting a saturated hydrocarbon thiol wherein the sulfhydryl group is linked to a non-tertiary carbon atom in a reaction zone with a gas containing free oxygen and a catalytic quantity of a nitrogen oxide produced in said reaction zone by decomposition of nitric acid, maintaining not more than about 0.2 mol of water per mol of said hydrocarbon thiol in said reaction zone, and recovering from said reaction zone a sulfonic acid so produced.

5. The process of claim 2 wherein the hydrocarbon thiol is an alkanethiol wherein the sulfhydryl group is linked to a non-tertiary carbon atom.

6. The process of claim 2 wherein the hydrocarbon thiol is an alkanethiol containing at least 10 carbon atoms in the molecule and wherein the sulfhydryl group is linked to a non-tertiary carbon atom.

7. The process of claim 2 wherein the hydrocarbon thiol is n-dodecanethiol.

8. The process of claim 2 wherein the hydrocarbon thiol is n-hexadecanethiol.

9. The process of claim 2 wherein the hydrocarbon thiol is n-butanethiol.

10. A process for the production of a sulfonic acid, which process comprises contacting an alkanethiol wherein the sulfhydryl group is linked to a non-tertiary hydrocarbon in the liquid phase with $N_2O_4$ in quantity sufficient to produce a compound containing about 1 mol each of said alkanethiol and $N_2O_4$, and thereafter oxidizing said compound with a gas containing free oxygen and a catalytic quantity of $N_2O_4$ under substantially anhydrous conditions to produce an alkanesulfonic acid.

11. The process of claim 10 wherein the alkanethiol is n-dodecanethiol.

12. A process for the production of an alkanesulfonic acid which comprises contacting a primary alkanethiol with a gas containing free oxygen and between about 1 and about 50 percent by weight, based upon oxygen consumed, of a nitrogen oxide selected from the group consisting of NO, $NO_2$, $N_2O_3$, $N_2O_4$ and $N_2O_5$ under substantially anhydrous conditions at a temperature between about 20° F. and about 300° F. for a period of time sufficient to effect substantial oxidation of said alkanethiol to produce an alkanesulfonic acid.

13. A process for the production of a sulfonic acid which comprises contacting n-dodecane-1-thiol with a gas containing free oxygen and between about 1 and about 50 percent by weight, based upon oxygen consumed, of a nitrogen oxide selected from the group consisting of NO, $NO_2$, $N_2O_3$, $N_2O_4$ and $N_2O_5$ under substantially anhydrous conditions at a temperature between about 20° F. and about 300° F. for a period of time sufficient to effect substantial oxidation of said thiol to produce a sulfonic acid.

14. A process for the production of an alkanesulfonic acid which comprises contacting a primary alkanethiol with a gas containing free oxygen and between about 1 and about 50 percent by weight of $NO_2$ based on oxygen consumed, under substantially anhydrous conditions, at a temperature between about 20° F. and about 300° F. for a period of time sufficient to effect substantial oxidation of said alkanethiol to produce an alkanesulfonic acid, and recovering an alkanesulfonic acid thus produced.

15. A process for the production of an alkanesulfonic acid which comprises contacting a primary alkanethiol with a gas containing free oxygen and between about 1 and about 50 percent by weight of $NO_2$, based on oxygen consumed, under substantially anhydrous conditions, at a temperature between about 50° F. and about 120° F. for a period of time sufficient to effect substantial oxidation of said alkanethiol to produce an alkanesulfonic acid, and recovering an alkanesulfonic acid thus produced.

WAYNE A. PROELL.
BERNARD H. SHOEMAKER.

REFERENCES CITED

The following references are of record in the file of this patent:

UNITED STATES PATENTS

| Number | Name | Date |
|---|---|---|
| 1,662,664 | Flemming | Mar. 13, 1928 |
| 1,908,935 | Tschunkur | May 16, 1933 |

FOREIGN PATENTS

| Number | Country | Date |
|---|---|---|
| 335,601 | Germany | Apr. 8, 1921 |